No. 626,157. Patented May 30, 1899.
J. W. GAMBLE.
APPARATUS FOR TREATING GARBAGE.
(Application filed Apr. 23, 1898.)
(No Model.) 3 Sheets—Sheet 1.
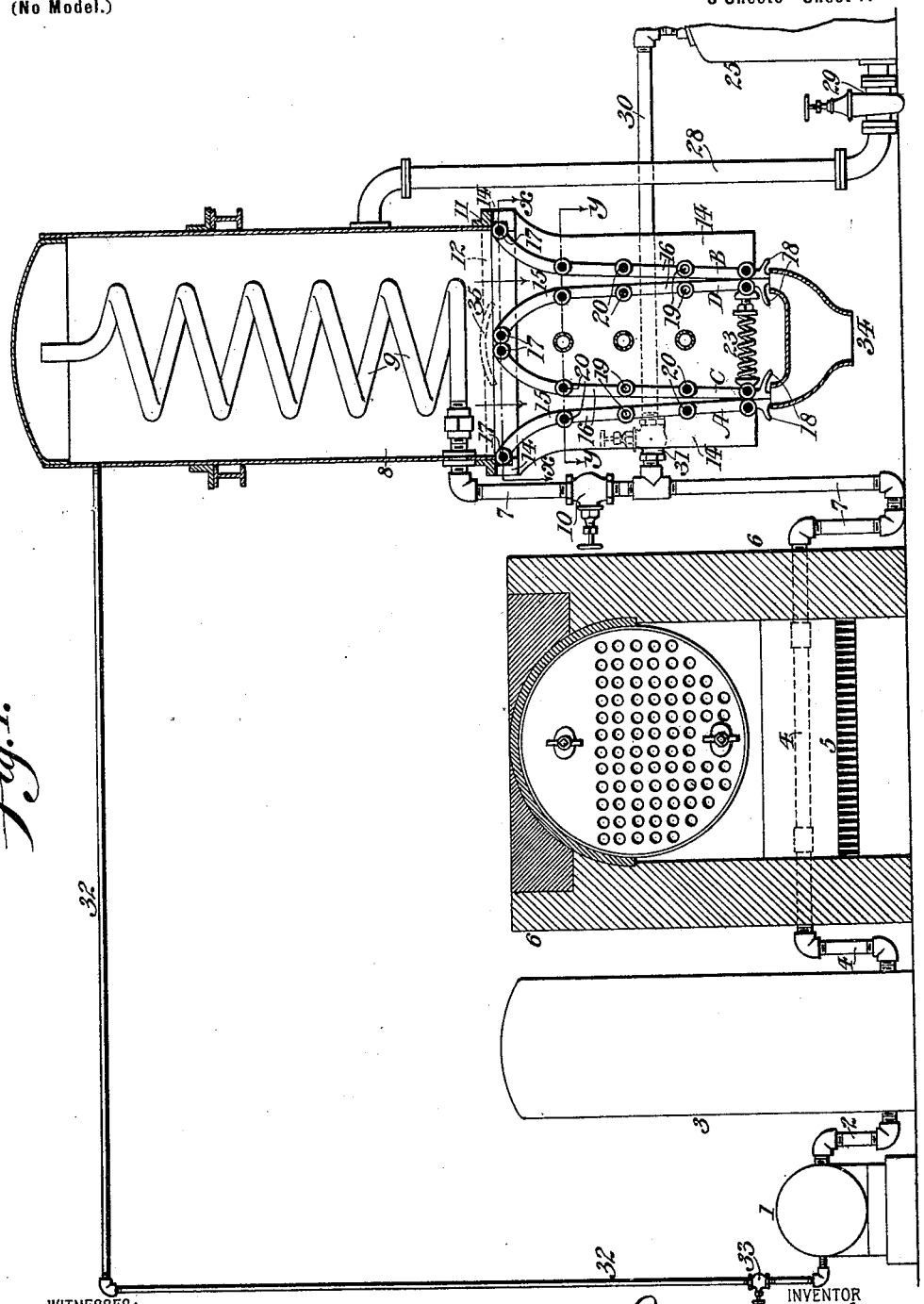

No. 626,157. Patented May 30, 1899.
J. W. GAMBLE.
APPARATUS FOR TREATING GARBAGE.
(Application filed Apr. 23, 1898.)
(No Model.) 3 Sheets—Sheet 2.
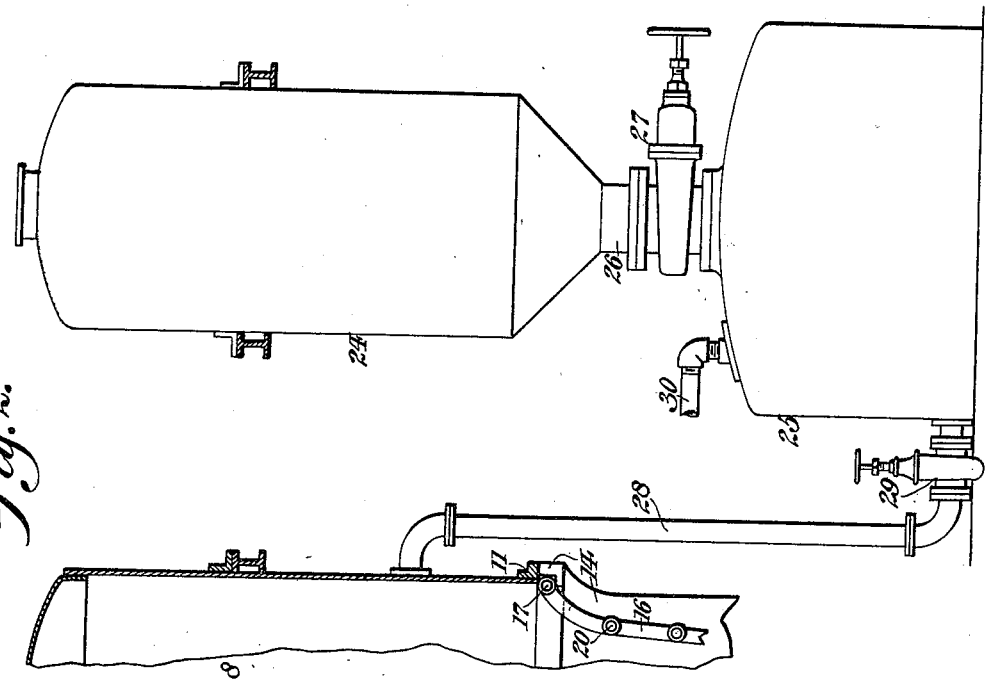
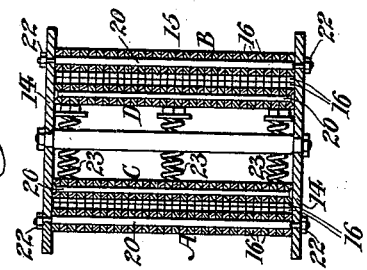
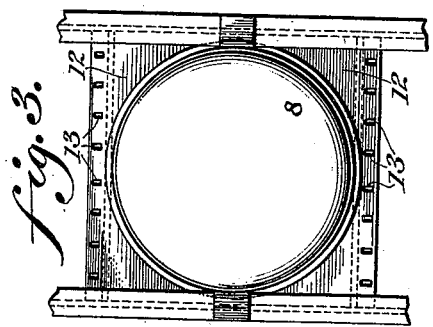
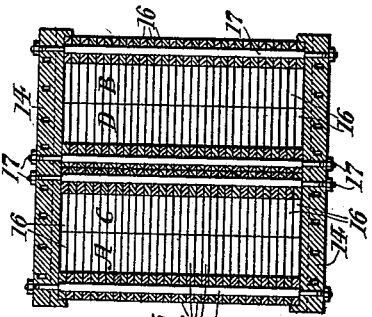
WITNESSES:
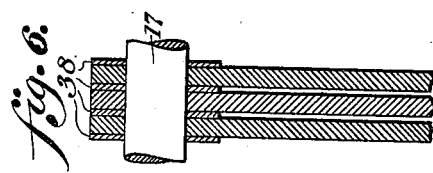
INVENTOR
ATTORNEYS.

No. 626,157. Patented May 30, 1899.
J. W. GAMBLE.
APPARATUS FOR TREATING GARBAGE.
(Application filed Apr. 23, 1898.)
(No Model.) 3 Sheets—Sheet 3.
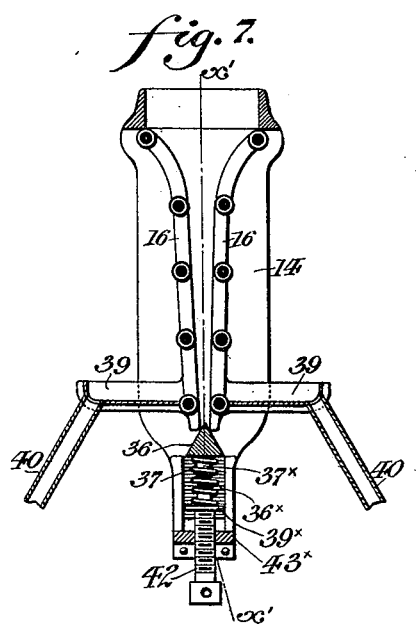
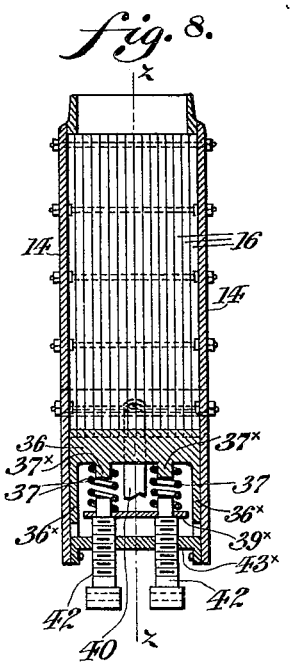
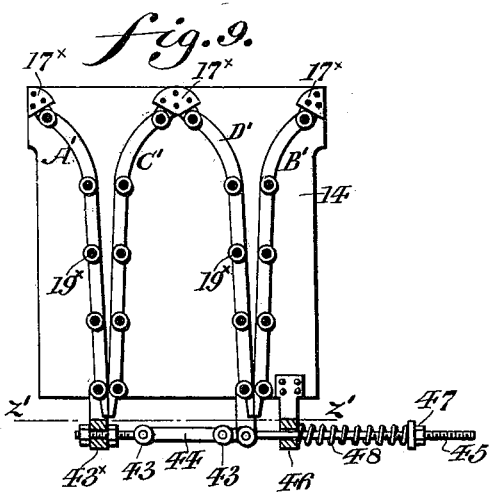
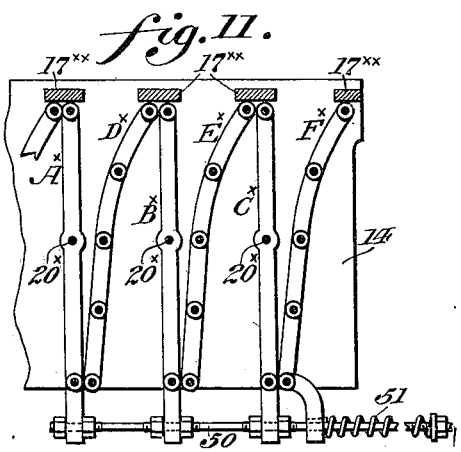
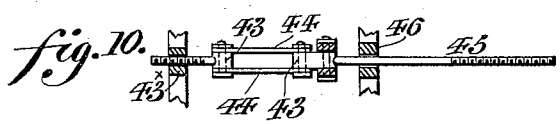
WITNESSES:
L. Douville,
O. F. Nagle.
INVENTOR
Joseph Willard Gamble,
BY
Wiedersheim & Fairbanks
ATTORNEYS.

UNITED STATES PATENT OFFICE.

JOSEPH WILLARD GAMBLE, OF PHILADELPHIA, PENNSYLVANIA, ASSIGNOR OF ONE-HALF TO GEORGE ELLIS GAMBLE, OF SAME PLACE.

APPARATUS FOR TREATING GARBAGE.

SPECIFICATION forming part of Letters Patent No. 626,157, dated May 30, 1899.

Application filed April 23, 1898. Serial No. 678,561. (No model.)

*To all whom it may concern:*

Be it known that I, JOSEPH WILLARD GAMBLE, a citizen of the United States, residing in the city and county of Philadelphia, State of Pennsylvania, have invented a new and useful Improvement in Grease and Water Extracting Apparatus for Garbage-Reduction Plants, which improvement is fully set forth in the following specification and accompanying drawings.

My invention relates to improvements in apparatus for treating or reducing garbage, whereby the oils or grease contained therein may be effectively extracted from the solid matter, the object being to provide in a simple and inexpensive manner an apparatus of this character wherein the garbage may be placed in its raw state and properly reduced by boiling, the same being afterward subjected to the action of novel pressing or straining devices, whereby the oil, water, grease, or other liquid is effectively and completely separated therefrom.

It further consists of novel details of construction, all as will be hereinafter fully set forth, and particularly pointed out in the claims.

Figure 1 represents a vertical sectional view, partly in elevation, of an apparatus for treating or reducing garbage embodying my invention. Fig. 2 represents a side elevation of the digester wherein the garbage is reduced by boiling, showing also a tank and its adjuncts communicating therewith. Fig. 3 represents a detached plan view of the frame which supports the extracting devices. Fig. 4 represents a section on line $x\ x$, Fig. 1. Fig. 5 represents a section on line $y\ y$, Fig. 1. Fig. 6 represents a vertical section through a plurality of strainer-plates in assembled position, showing also the distance-pieces therebetween. Fig. 7 represents a section on line $z\ z$, Fig. 8, showing a modified form of extracting device. Fig. 8 represents a section on line $x'\ x'$, Fig. 7. Fig. 9 represents a modified form of the extracting devices. Fig. 10 represents a section on line $z'\ z'$, Fig. 9. Fig. 11 represents another embodiment of the principle of my invention.

Similar letters and figures of reference indicate corresponding parts in the figures.

Referring to the drawings, 1 designates an air-compressor of any suitable construction, having a pipe 2 leading therefrom to a storage-reservoir 3, which latter is connected to the pipe 4, located adjacent a grate 5 of a furnace 6. The pipe 4 connects with the pipes 7, which lead into a chamber 8 to a coil 9, the terminal of which extends toward the top of said chamber and is open to admit the hot air thereinto when desired or necessary.

10 designates a valve in the pipe 7, which regulates the admission of air into the chamber 8, said air becoming suitably heated before its entrance into said chamber. The chamber 8 is closed at its upper end and open at its lower end, which latter is supported on a flanged collar 11, which is secured to the lower edge of said chamber to give greater strength and rigidity thereto, as well as to provide laterally-projecting flanges 12, wherein a series of slots 13 are located, which latter are adapted to register with similar slots in the edges of depending plates 14. Suitable bolts or similar fastening devices (not shown) passing through these slots will serve to admit of an adjustment of the plates 14 and will also secure the latter in their proper position with relation to the chamber 8. The plates 14 project below the lower end of the chamber 8 and form side walls and supports for the extracting devices 15, which are composed of a plurality of strainer-plates 16, arranged upon rods 17, which extend intermediate the plates 14, said rods having their ends threaded and secured in openings in said plates 14 by nuts or any other suitable means.

By reference to Figs. 1, 4, 5, and 6 it will be observed that the plates 16, above referred to, are made up in groups, the two outer groups being stationary and marked A B and two inner being marked C D, the two latter being pivotally secured to the plates 14 at their upper ends, from which point they curve outwardly a portion of their length and thence diverge slightly in substantially a straight line to their lower extremities, while the outer groups A B are curved inwardly, their lower extremities converging to a point where they touch the lower extremities of the groups C and D. Each plate in each group is also formed with a laterally-projecting finger 18, which when the same are grouped together, as above described, form ledges over which the oil or grease will be directed, and said plates are still further provided with openings 19 at suitable intervals throughout their length, through which strengthening-rods 20 are passed to give greater rigidity thereto.

The outer groups A and B of the plates 16 are rigidly secured to the side walls 14 by means of their stay bolts or rods 20, which pass through the alining openings 19 and through suitable openings in said walls 14, their extremities being threaded to receive nuts 22. The inner groups, however, are free to move upon their pivots toward each other at their lower extremities, springs 23 being arranged at proper intervals to keep them apart and to offer resistance to the garbage, as will be described.

The digester 24, wherein the garbage is placed in its raw state for treatment, is shown in Fig. 2 as supported in any convenient manner and in communication with a tank 25 through the neck 26, a suitable valve 27 being interposed to control the communication between said digester and tank.

28 designates a pipe which leads from the bottom of the tank 25 into the chamber 8, through which the garbage in its reduced or fluid state is forced into said chamber, where it is presented to the action of the extracting device 15, said pipe 28 having a valve 29 therein to regulate the supply to said chamber.

30 designates a pipe leading from the top of the tank 25 to the pipe 7 and through which the hot compressed air passes and forces the material contained in the tank 25 up through the pipe 28 into the chamber 8 when the valve 29 is opened.

31 designates a valve in the pipe 30 for controlling the supply of air to the tank 25.

In order that the air may be kept at a uniformly high temperature within the chamber 8, which I consider to be extremely necessary, I connect a pipe 32 of small diameter to the upper end of the chamber 8 and connect the opposite end of the said pipe to the suction side of the compressor 1, so that when the valve 33 in said pipe 32 is opened, as also the valves 29 and 31, the pressure of the air will be exerted upon the surface of the garbage in the tank 25 and force it up through the pipe into the chamber 8, after which the valves 29 and 31 are closed. The valve 10 is then opened, and the hot air passing up through the pipes 7 and 9 into the chamber 8 forces the garbage downwardly therefrom and subjects it to the pressing or extracting devices, as indicated by the arrows in Fig. 1, whereby the garbage is forced between the outer and inner strainer-plates, causing the lower extremities of the inner groups to press inwardly against the action of the springs, which will cause the oil or grease contained in the garbage to be separated therefrom and pass into a suitable receptacle, which may communicate with a tank located in any convenient place, the garbage passing into the receptacle 34. The suction created in the pipe 32 aids materially in withdrawing the garbage from the tank 25, while it also serves to return to the compressor air in a heated condition, insuring in this way a practically uniform heat throughout the disintegrating or reducing process.

The pressure exerted upon the strainer-plates in order to thoroughly extract the grease or oil from the garbage is necessarily very great, and it may be found expedient to employ a greater resistance to the movement of the lower extremities of said plates, as the spring shown and described might under very high pressure prove insufficient. If desired, I may move the pivotal points of the groups C and D to a lower level, as is hereinafter explained, in which event, however, it is evident that the movable members of said groups will be balanced, and those portions thereof that lie above the pivotal point will open or spread apart, when the lower extremities are forced toward each other and so receive some of the garbage which could not be acted upon to extract the grease or oil. To prevent the escape of the garbage, I arrange a plate 35 (shown in dotted lines, Fig. 1) immediately above to cover the gap thus made, said plate being curved, so that the garbage will readily pass over the edges thereof and be directed into its proper channel, as indicated by the arrows, Fig. 1.

A reduction in the area controlled by the springs employed may be accomplished by giving to the pressing or extracting devices 15 at their lower extremities a predetermined opening and bolting said devices rigidly to the side walls 14. A spring-actuated valve 36, which is preferably wedge-shaped or may be a flat plate, if desired, is arranged so as to control said opening, as in Fig. 7, the springs 37 serving to keep said valve closed until such time as the pressure thereon shall become unduly increased, whereupon said valve will open and allow the garbage to pass off after the grease or oil has been strained through the spaces between the strainer-plates 16 and carried off as above described. It is evident that as the longitudinal area of the opening between the straining or pressing devices is very much less than the vertical area presented to the garbage the tension of the spring need not be very great to hold the valve until the desired pressure has been reached.

Under certain conditions it may be found desirable to provide an open space between each of the strainer-plates 16 in order that the oil or grease may flow more freely therethrough, and I therefore interpose between said plates the distance pieces or washers 38.

In Figs. 7 and 8 I employ two oppositely-disposed groups of strainer-plates 16, each group being provided at or near its lower extremity with an outwardly-projecting tray 39 for the reception of the grease or oil, which exudes between the strainer-plates 16, from whence it is carried away by the pipes 40 to any desired place. The valve 36 below the plates 16 offers sufficient resistance to the outflow of the garbage to thoroughly strain the oil or grease therefrom as it is forced downwardly, as above described. The pressure upon the valve 36 can be increased or diminished by the screws 42, as will be apparent. In the preferred construction I provide the valve 36 with the depending wings 36˟ and the bosses 37˟, which are engaged by one end of the springs 37, the other ends of the latter abutting against the plate 39˟, which is supported on shoulders on the screws 42, the latter passing through the plate 43˟, which is secured to the lower portion of walls 14.

In Figs. 9, 10, and 11 I have shown other forms of the straining or pressing devices wherein the groups or plates are arranged so as to be alternately rigid and movable, the plate shown in Fig. 9 being formed in substantially the same manner as those already described, except that the groups C' and B' are stationary, being rigidly secured to the side walls 14, while the adjacent groups A' and D' are movable, the latter being pivoted at the points 19˟. The lower ends of the groups A' and D' are coupled together by the boss 43, which has a threaded stem engaging the extension 43˟, links 44, and threaded rod 45, which latter passes through a guide-eye 46, secured to one of the side walls 14, and has a nut or washer 47 thereon, between which and the guide is interposed a spring 48, the function of which is to offer resistance to the movement of the pivoted groups during the treatment of the garbage, as hereinbefore described. The construction shown in Fig. 11 and the mode of exerting tension upon the movable groups are substantially the same as that just described, the groups of plates A˟, B˟, and C˟ being straight and pivoted at the points 20˟, while the groups D˟, E˟, and F˟ are stationary and slightly curved, it being noted that the plates 17˟ and 17˟˟ serve to prevent the garbage from escaping when the movable groups are operated. The lower extremities of the movable groups in this instance are controlled by the rod 50 and its adjuncts, as is evident, whereby the extracting devices are held and adapted to move simultaneously and uniformly against the action of the spring 51.

It is obvious from the foregoing that many modifications may be made without departing from the spirit and scope of my invention, it being apparent, first, that any gas which is non-condensable at the pressure carried in the pressing-chamber 8 may be substituted for the hot air described; second, that the air-pressure or pump may be used in combination with rollers, sliding plates, and chain devices to compress the liquid mass between the strainer-plates, and, third, a continuous feed of the garbage may be arranged by using a pump of such character that the garbage may be forced into the chamber 8 in a steady stream and against the pressure already contained therein, as is evident.

It will be understood that the pipe 4 (seen in Fig. 1) should be preferably a coil or loop in order to secure a maximum amount of heating-surface and that, if desired, I may use a pump in combination with the strainer-plates and dispense with compressed air, and, if expedient, both sets of strainer-plates may be made movable, and it may also be desirable in some instances to set the strips composing the strainer-plates at a considerable distance apart and cover the frame thus formed with a screen or wire-cloth of comparatively fine mesh, or burlap may be used to cover the frame.

While the above description is for garbage plants, it will be understood that I do not wish to limit myself to this use only, as the device may be used for all purposes where it is desired to separate fluid from solid matter.

Having thus described my invention, what I claim as new, and desire to secure by Letters Patent, is—

1. In an apparatus of the character named, a chamber having an open end adjacent which are situated opposing outwardly extending and converging strainer-plates, and means for introducing material to be treated into the chamber and for heating and expelling the same through the open end thereof to and between said strainer-plates.

2. In an apparatus of the character named, a chamber having an open end adjacent which are situated opposing outwardly extending and converging strainer-plates, one of said plates being stationary and the other yieldingly held toward the stationary plate, and means for introducing material to be treated into the chamber and for heating and expelling the same through the open end thereof to and between said strainer-plates.

3. In an apparatus of the character specified, the combination of a pressure-chamber having an open end, strainer-plates located opposite said open end, each of said plates being composed of a plurality of strips suitably supported and having interposed distance-pieces between each plate to provide a plurality of elongated openings or slots therebetween, and means for introducing material to be treated into the chamber and for heating and expelling the same through the open end thereof to and between said strainer-plates.

4. In an apparatus of the character named, the combination of a pressure-chamber having strainer-plates located adjacent thereto, an air-compressor adapted to produce pressure in said tank, means for heating the air prior to its introduction in said tank, and valves adapted to enable said tank to be charged by compressed heated air.

5. In an apparatus of the character named, the combination of a pressure-chamber, a tank adapted for the reception of garbage, means for forcing a portion of the garbage in said tank into said chamber, a plurality of strainer-plates pivotally supported in proximity to said chamber and means for extracting the fluid matter from the garbage in said chamber.

6. In an apparatus of the character named, the combination of an air-compressor, a chamber having an open end, a pipe leading from said air-compressor and into said chamber and ending near the closed end thereof and communicating therewith, means for heating the air after it leaves said compressor and before entering the chamber, a plurality of strainer-plates located adjacent the open end of said chamber, said plates being composed of a plurality of superposed strips having elongated openings therebetween, and means for holding said plates in juxtaposition and for forcing the material through the open end thereof to and between said plates.

7. In an apparatus of the character named, a chamber having an open end and having its closed end communicating with a suitable source supplying compressed air, a plurality of sets of strainer-plates extending from the open end of said chamber, one plate of each of said sets being stationary and the other yieldingly held relative thereto, and means for causing the movable plates to move in unison.

8. In an apparatus of the character specified, the combination of a chamber having an open end, a pipe extending through the body of the chamber and having an open end near the closed end of the latter, said pipe communicating with a suitable source for supplying hot air under pressure, and means for supplying the material to be treated to said chamber, a plurality of rigid strainer-plates situated opposite and converging from the open end of said chamber, the outer ends being separated a little distance, the valve controlling the opening between the outer ends of said plates, and trays extending laterally from the exterior of said plates and pipes leading from said trays.

9. In an apparatus of the character named, the combination of a pressure-tank, means for conducting garbage thereinto, means for conducting compressed air thereinto, strainer-plates located under said tank, certain of said plates being stationary while the remainder of said plates are pivotally supported at a point intermediate their ends, and means for preventing the material in said pressure-tank from improperly leaving the latter until a suitable pressure is obtained.

JOSEPH WILLARD GAMBLE.

Witnesses:
BENJ. C. WARNICK,
JOSHUA MATLACK, Jr.